(12) United States Patent
Caldoro et al.

(10) Patent No.: US 6,474,970 B1
(45) Date of Patent: Nov. 5, 2002

(54) MOULD FOR MOULDING A GLAZING PROFILE ON A SHEET OF GLAZING MATERIAL

(75) Inventors: Nicola Caldoro, Turin; Ciro Paudice, Vasto, both of (IT)

(73) Assignee: Societá Italiana Vetro-SIV-S.p.A., Chieti (IT)

( * ) Notice: Subject to any disclaimer, the term of this patent is extended or adjusted under 35 U.S.C. 154(b) by 0 days.

(21) Appl. No.: 09/570,918

(22) Filed: May 15, 2000

(30) Foreign Application Priority Data

May 24, 1999 (EP) .............................................. 99830315

(51) Int. Cl.[7] .......................... B29C 70/76; B29C 70/78
(52) U.S. Cl. ....................... 425/125; 264/252; 425/127; 425/16.58
(58) Field of Search ...................... 264/252; 425/127, 425/125, 120, DIG. 58

(56) References Cited

U.S. PATENT DOCUMENTS

| | | | | |
|---|---|---|---|---|
| 3,193,884 A | * | 7/1965 | Haynie et al. ........ | 425/DIG. 58 |
| 4,561,625 A | | 12/1985 | Weaver ................ | 425/127 |
| 4,795,667 A | | 1/1989 | Armstrong ........... | 264/275 |
| 4,839,122 A | | 6/1989 | Weaver ................ | 264/275 |
| 5,302,333 A | * | 4/1994 | Capriotti et al. ..... | 264/252 |
| 5,316,829 A | | 5/1994 | Cordes et al. | |
| 5,382,395 A | * | 1/1995 | Hoenke ................ | 264/252 |
| 5,421,940 A | * | 6/1995 | Cornils et al. ........ | 156/107 |
| 5,443,673 A | | 8/1995 | Fisher et al. ......... | 264/259 |
| 5,456,874 A | | 10/1995 | Cordes et al. ........ | 264/252 |
| 5,547,359 A | | 8/1996 | Cordes et al. ........ | 425/125 |
| 5,580,628 A | | 12/1996 | Cordes et al. | |
| 6,034,320 A | * | 3/2000 | Malcherczyk et al. | 136/251 |

FOREIGN PATENT DOCUMENTS

| | | |
|---|---|---|
| EP | 0 156 882 B1 | 10/1985 |
| EP | 0 412 299 A2 | 2/1991 |
| EP | 0 529 815 A1 | 3/1993 |
| WO | 94/20721 | 9/1994 |
| WO | 98/05487 | 2/1998 |
| WO | 98/30377 | 7/1998 |
| WO | WO00/06361 | * 2/2000 |

* cited by examiner

Primary Examiner—Robert Davis
(74) Attorney, Agent, or Firm—Burns, Doane, Swecker & Mathis, L.L.P.

(57) ABSTRACT

A mould is described for moulding an elastomeric glazing profile in situ on a single major face of a sheet of glazing material, e.g. a glass sheet. The mould comprises a first mould segment and at least one further mould segment which are relatively movable into intimate contact, so that they define, together with the sheet, a mould cavity for moulding the profile on the single major face. The profile has a show face, (i.e. one which is visible in use), and the portion of the mould cavity that moulds the show face is entirely formed by a single mould segment to avoid mould lines on the show face. Also described are a corresponding moulding method and the glazing product thereby obtained, which may be used as a vehicle window.

9 Claims, 4 Drawing Sheets

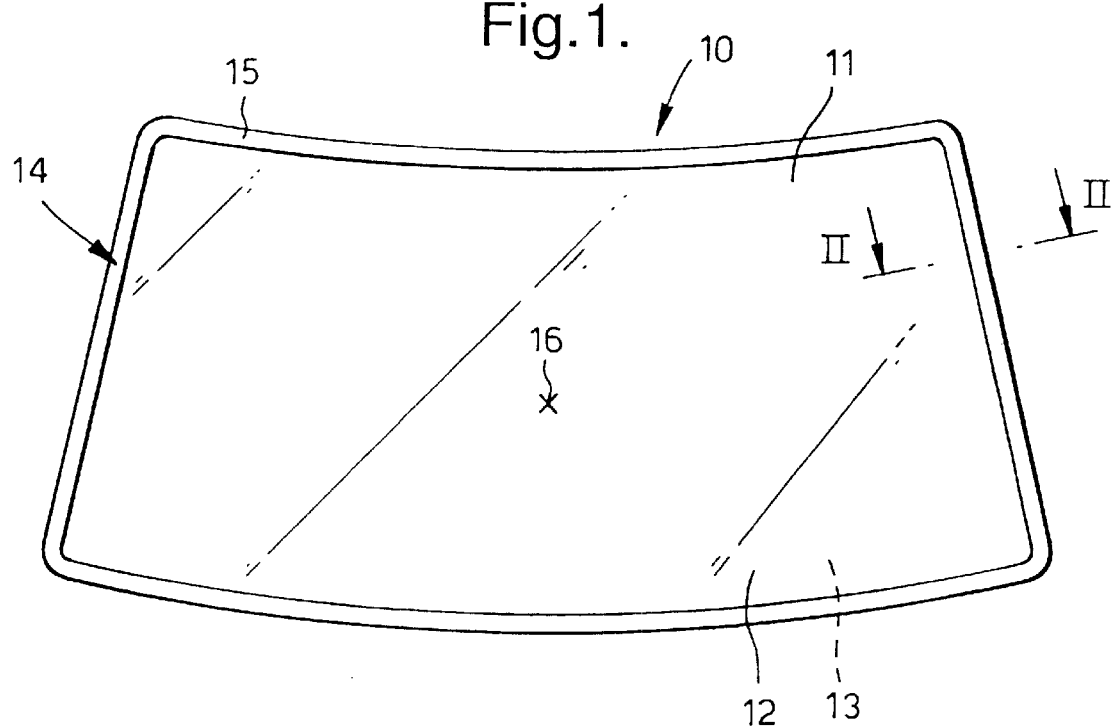
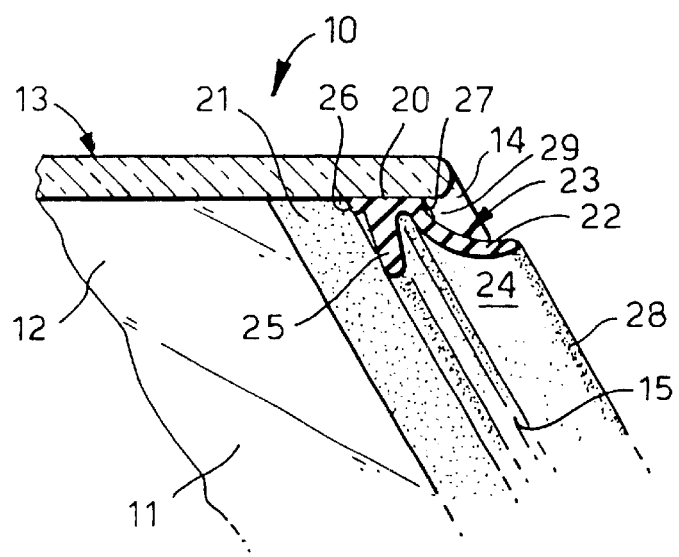

MOULD FOR MOULDING A GLAZING PROFILE ON A SHEET OF GLAZING MATERIAL

BACKGROUND OF THE INVENTION

1. Field of the Invention

The present invention relates to a mould for moulding an elastomeric glazing profile in situ on a sheet of glazing material, and to a method for moulding the profile. It also relates to a glazing comprising a sheet of glazing material with an elastomeric glazing profile moulded on it; the glazing may be a vehicle glazing for glazing a vehicle window, e.g. a backlight for glazing a rear window.

2. Description of the Related Art

It is known to provide a unitary glazing comprising a sheet of glazing material with an elastomeric glazing profile moulded in situ on the sheet by a technique known as edge encapsulation. Materials in sheet form have two major faces and one or more peripheral edge faces, and as the term edge encapsulation implies, in this known technique, the material from which the profile is moulded extends over a marginal portion of one major face, over the peripheral edge, and onto the other major face. A simple mould for edge encapsulation generally comprises two mating segments which define the mould cavity together with the sheet of glazing material. Some of the glazings ("parts") required by vehicle manufacturers include an "undercut" portion, i.e. in cross-sectional view the part includes a recessed portion. The recessed portion (also known as a re-entrant portion) may be within the profile or at the meeting-point of the sheet glazing material and the profile. It is known to incorporate moving mould segments into the mould design for such parts, the reasons generally being either so that the mould can actually be machined in the first place, and/or so that the part can be removed after moulding. These moving mould segments are frequently termed "sliding cores", and an example is described in EP 156 882 B1 (corresponding to U.S. Pat. No. 4,561,625 and partially corresponding to U.S. Pat. No. 4,839,122) in column 5 at line 22 et seq. For some years, it has been an important consideration in the motor industry to reduce the fuel consumption of vehicles, and reducing the drag coefficient (i.e. the air resistance) of vehicles can make a significant contribution to this. One way to reduce a vehicle's drag coefficient is to arrange the vehicle glazing to be flush with the bodywork to give the vehicle a smooth external contour; this is termed "flush glazing". It will be appreciated that edge encapsulation as taught in EP 156 882 B1 is incompatible with flush glazing, because the portion of the glazing profile on the outside face of a window-pane protrudes from it. Vehicle manufacturers therefore demand that a glazing profile should be present on only one of the two major faces of a window-pane; these products are referred to as "single sided".

Extrusion lends itself to the manufacture of such products, but is not without disadvantages. For instance, it is difficult (and requires expensive measures) to obtain a satisfactory joint between the beginning and the end of the extruded profile; materials suitable for extrusion which are also sufficiently durable to give an adequate service life are expensive, and one cannot extrude around a sharp corner.

Attempts have therefore been made to develop moulding techniques to make single sided products, and one example is known from WO 98/05487. However, some shortcomings remain, as will now be explained. A surface of a glazing profile which is visible when the glazing is installed in a vehicle is termed a "show face" (this is normally the outward-facing surface). One consequence of the move to flush glazing is that the show face is no longer wholly positioned on the outside of the window-pane, rather, it may be at least partly positioned inwardly of the inside face, and is generally on a member such as a lip or tongue which extends beyond the inside face.

Frequently, the area of contact between the glazing profile and the pane is positioned adjacent the peripheral edge of the window-pane, but slightly displaced towards the centre of the latter. This results in a recess defined by the glazing profile and the pane together, i.e. the part includes an undercut. The recess is positioned adjacent the contact area between the pane and the profile on one side, and adjacent the peripheral edge of the pane on the other side. A conventional mould for such a part needs to include sliding cores to allow removal of the part, generally one per side so that a generally rectangular pane would require four sliding cores meeting at the corners.

Unfortunately it is usually the case that lines are left on the moulded profile at the joints where the sliding cores meet; with single sided moulding these mould lines are on the show face and hence objectionably visible. This was not so for the true edge encapsulated products made in the mould of EP 156 882 B1; although mould lines occurred, they were not positioned on the show face and hence could be tolerated. A related disadvantage of sliding cores is that the liquid moulding material may penetrate the joints and then set to a solid, i.e. limited leakage may occur. The resulting flap or fringe of elastomer (known as "flash" in the industry) on the curved profile must be removed, generally by a manual trimming operation, leaving a mould line as mentioned above. Furthermore, it is generally the case that the complexity of moulds with multiple sliding cores adds to their cost and makes them prone to such leakage.

SUMMARY OF THE INVENTION

It would therefore be desirable to mould a glazing profile in situ on a single face of a sheet of glazing material such that the profile is not susceptible to mould lines on its show face.

Accordingly, the present invention provides a mould for moulding an elastomeric glazing profile in situ on a sheet of glazing material having two major faces and a peripheral edge face, the profile having a show face, wherein the mould comprises a first mould segment and at least one further mould segment which are relatively movable into a position in which they are in intimate contact with each other, at least one of the mould segments being arranged to receive the sheet of glazing material, and the mould segments defining together with the sheet a mould cavity for moulding the profile on a single major face of the sheet, and wherein the portion of the mould cavity that moulds the show face is entirely formed by a single mould segment.

Normally the entire show face is moulded by a single mould segment. Designing the mould so that the show face is entirely moulded by a single mould segment clearly obviates the problem of mould lines on the show face, since there are no joints present on the mould surface defining the show face to yield mould lines. Furthermore, as the design is inherently simple, both construction and operation are facilitated, and the cost is reduced, compared with known moulds. Reliability is increased and leakage reduced. Moreover, the heavy press required for conventional edge encapsulation is no longer necessary, and the disadvantages of extrusion techniques are avoided.

The mould is especially useful for parts having undercut portions, i.e. re-entrant portions which would mechanically lock the part into a simple fixed mould (i.e. one without a moving mould segment). For such undercut parts, a corresponding portion of the appropriate mould segment is itself undercut.

The mould is also useful for parts having sharp corners, as it is not possible to extrude a profile satisfactorily around a corner having a radius of less than 20 mm, and radii of less than 30 mm present difficulties in maintaining the cross-section of an extruded profile. The reproducibility of corners of profiles may also be better with moulding than with extrusion.

Moulding possesses the further advantage over extrusion that it is possible to vary the cross-section of the profile around the glazing, e.g. to incorporate a high mounted stop lamp (also known as a third brake light).

Preferably, one of the mould segments is annular in form, at least in the vicinity of the mould cavity. This facilitates removal of the part after moulding.

The advantage of simplicity of construction and operation is maximised when the mould comprises a single further mould segment, so that there are just two mould segments in total. Note that the term "mould segment" is used to refer to a component of the mould which provides part of the wall of the mould cavity; ancillary mould components such as retaining means for the sheet of glazing material (e.g. clamps or vacuum cups) or actuating mechanisms are not included.

In another aspect, the present invention also provides a method of making a glazing by moulding an elastomeric glazing profile in situ on a sheet of glazing material having two major faces and a peripheral edge face, the profile having a show face, the method comprising the steps of:

positioning the sheet of glazing material in a mould comprising a first mould segment and at least one further mould segment, retaining the sheet in position with retaining means, moving at least one of the mould segments relative to the others into a position in which they are in intimate contact with each other and together with the sheet of glazing material define a mould cavity for moulding the profile on a single major face of the sheet, wherein the part of the mould cavity that moulds the show face is formed entirely on a single mould segment, injecting liquid resinous material into the mould cavity, allowing the liquid resinous material to cure at least to the extent that it becomes solid, moving at least one of the mould segments relative to the others into a position in which they are apart, and removing the glazing from the mould.

Furthermore, it has been found possible to remove the glazing from the mould by temporarily deforming part of the profile to allow it to pass over one of the mould segments. This is especially advantageous when a part with an undercut portion is being moulded.

In a further aspect, the invention relates to a glazing comprising a sheet of glazing material having 2 major faces and a peripheral edge face, and an elastomeric glazing profile bonded to a single major face of the sheet, the profile having a show face, wherein the profile is formed by moulding it in situ on the sheet in a mould cavity of a mould comprising two or more mould segments wherein the part of the mould cavity that moulds the show face is formed entirely on a single mould segment.

BRIEF DESCRIPTION OF THE DRAWINGS

The invention will now be further described by way of the following specific embodiments, which are given by way of illustration and not of limitation, and with reference to the accompanying drawings in which:

FIG. 1 is a view of a glazing including a glazing profile, taken in a direction approximately perpendicular to its surface;

FIG. 2 is an enlarged fragmentary perspective view of the glazing, partially in cross-section, showing the shape of the glazing profile;

DETAILED DESCRIPTION OF THE PREFERRED EMBODIMENT

Figure 3:
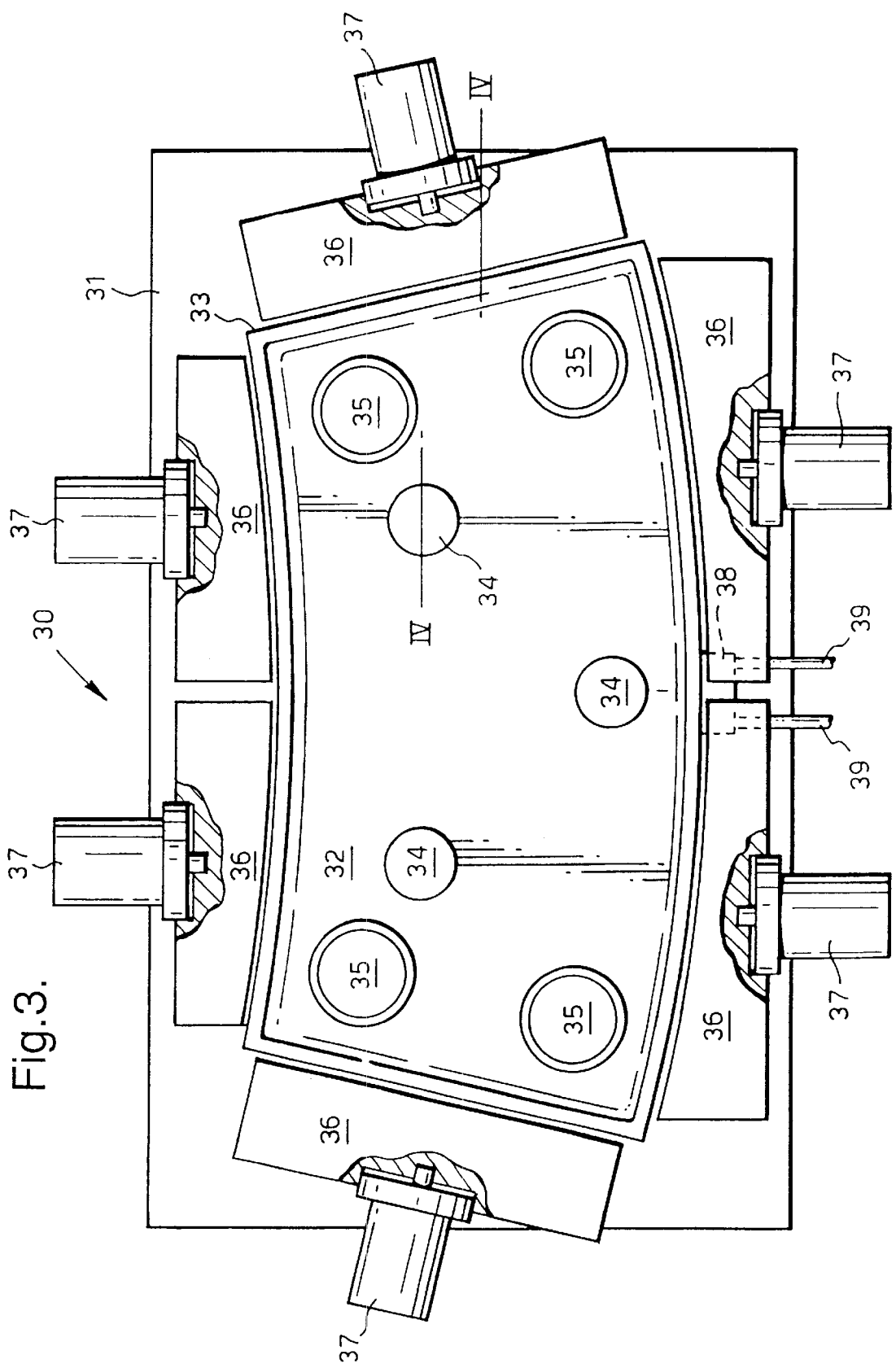
FIG. 3 is a plan view of a mould for moulding the profile of FIGS. 1 and 2.

Referring to FIG. 1, there is shown a glazing 10 comprising a sheet of glazing material 11 having two major faces 12,13, a peripheral edge face 14, and a centre 16. The glazing is suitable for use as a window-pane in a vehicle, for instance it may be a backlight for glazing a rear window, or a side glazing such as a rear quarterlight, or a windscreen or a rooflight. An elastomeric glazing profile 15 is moulded in situ on the sheet, around its periphery adjacent the peripheral face 14.

The sheet of glazing material may be a sheet of glass or of plastics. If of glass, the glass may be clear or tinted; annealed, toughened or laminated; planar or curved. For most of the current automotive parts having single sided mouldings, the sheet is of toughened curved glass, which may be clear or tinted. Reference will be made herein to the "plane" of the sheet of glazing material; where the sheet is curved this is a reference to a plane tangential to the sheet at its centre 16.

It can be seen that the glazing profile extends around the entire periphery of the sheet. In the case of some glazings, the profile may only be required around part of the periphery of the sheet, e.g. the profile may only extend along two or three sides of the sheet.

FIG. 2 shows a perspective view of part of the glazing 10, and the view is partially in cross-section. The profile 15 is bonded to the sheet 11 as a result of the in situ moulding process, the bond being over an area of mutual contact 20. The contact area 20 has inner and outer edges 26,27, and inner edge 26 is also the inner edge of the profile. It can be seen that the contact area is entirely on a single major face 12 of the sheet, and the other major face 13 remains free of the profile. Furthermore, the contact area does not extend onto the peripheral edge face 14, in fact the contact area is slightly inwardly displaced from the peripheral edge face, i.e. in a direction towards the centre 16 of the sheet to form a recess or re-entrant portion 29. Parts without the recess 29 can be moulded provided that the mould includes a means of sealing against peripheral edge face 14. An opaque band 21, commonly termed an obscuration band, may also extend around the periphery of the sheet adjacent the peripheral edge face; this band may be screen printed in a ceramic ink or applied by other means. References to the contact area 20 between the sheet 11 and the profile 15 apply regardless of whether the obscuration band 21 is present or not; when it is present, it obscures the contact area from external view.

The form of the profile shown in FIG. 2 includes a lip extending outwardly from the centre of the sheet. In this particular case, the lip is slightly curved in cross-section, and extends outwardly beyond the peripheral edge face 14 of the sheet, terminating in an outermost edge or tip 28. Clearly, the lip is not limited to this shape and configuration; it is designed to suit each different window. When installed in a vehicle, face 13 is the outer face of the pane and face 12 the inner face. The lip 22 similarly has two faces, 23 and 24, and accordingly, it is the face 23, which in FIG. 2 faces in approximately the same direction as outer face 13 of the sheet, which is at least partially visible from outside the vehicle. Note that when obscuration band 21 is present, it conceals an inner part of face 13 from external view. To the extent that it actually is externally visible, this face is termed the "show face". When installed in the vehicle, the other face of the lip abuts against part of the vehicle bodywork (not shown) and is concealed from view.

The lip may be up to 40mm wide; in practice most lips are in the range from 3 mm to 30 mm wide. Particularly preferred lip widths lie in the range 5 mm to 15 mm. (The width of the lip is defined as the dimension of the lip face 23 which is measured on the face in a direction perpendicular to its outermost edge 28). The profile may also optionally include a spacer portion 25 which extends adjacent the inner edge of the profile. After installation of the glazing, this profile portion abuts against a mounting flange of the vehicle bodywork (not shown). It serves as a spacer to maintain the glazing in the correct position in relation to the bodywork, and if the glazing is attached to the bodywork by adhesive bonding, it may additionally serve as a dam to limit the spread of the adhesive.

FIG. 3 is a plan view of a novel mould which may be used to mould the profile of FIGS. 1 and 2 in situ on the sheet of glazing material. In the illustrated embodiment, the mould 30 comprises a first mould segment 31 and a second mould segment 32 which moves relative to the first, although it would be a simple matter to make variants of the invention in which the other mould segment moved, or the mould comprised further mould segments, e.g. by separating the second mould segment into two or more segments.

The mould segments define, together with the sheet, the walls of a mould cavity (described below in connection with FIGS. 4 and 5) for moulding the profile, and the portion of the mould cavity wall that moulds the show face is entirely formed on the first mould segment 31. The first mould segment is constructed and arranged to receive and support the sheet, and may loosely be described as annular in form, at least in the vicinity of the mould cavity, since the first mould segment surrounds and encircles the second mould segment. Accordingly, an aperture 33 is provided in the first mould segment 31 in which the second mould segment is located.

Also positioned in the aperture are three columns 34 on which the second mould segment 32 is slidably located, and four suction cups 35 which serve to hold and retain the sheet of glazing material when required. Clearly the number of columns and suction cups may be varied. Further sheet-retaining means are provided in the form of six sliding clamp members 36, and again the number of these may be varied. The clamp members 36 are actuated by corresponding actuating cylinders 37, and slide forwards and downwards onto the sheet. This is unlike previous known moulds, in which the sheet is usually clamped between two half moulds; in the present invention the clamp members 36 do not constitute part of the mould proper, for they do not play a part in defining the mould cavity, as will become apparent in connection with FIG. 4. They may be considered part of the ancillary equipment surrounding the mould, and it is noteworthy that because the clamp members are not part of the mould proper, they constitute only one of a number of different designs of retaining means that may be used; any form of retractable pad that exerts a controllable downward pressure could be substituted.

Preferably at least the first mould segment 31 is pivotally mounted, e.g. on gimbals, to facilitate access to the mould cavity and in particular the part which moulds the show face, e.g. for cleaning and application of release agent.

FIG. 3 also shows part of the injection system for the injection of liquid resinous material. The injection system is conventional, and similarly, any of the known moulding materials which have suitable final material properties for use as elastomeric glazing profiles for vehicles may be employed. Two well-known material groups are polyurethanes as used in Reaction Injection Moulding ("RIM") and polyvinylchloride-based materials. In FIG. 3, the injection system (as far as it is shown) is suited to RIM, but it will be known to the skilled person how to adapt the system for other moulding materials. Two metered streams of reactants, one of a polyol mixture and the other of isocyanate, are delivered to a mixing head 38 via pipes 39. The two streams are thoroughly mixed in the mixing head, and delivered via a sprue (not shown) to the mould cavity, into which the mixture is injected.

The mould segments may be machined in any of the usual materials for RIM moulds, e.g. steel. Aluminium is a suitable material but most preferred is cast iron because this is less susceptible to warping and is less easily damaged.

It can be seen by comparing FIGS. 3 and 1 that the outline of the second mould segment 32 approximately corresponds to the outline of the sheet of glazing material 11. This is in marked distinction to known moulds in which the moving mould segment(s) merely correspond to a local portion of the profile at a specific point on the sheet, extending at most along one side thereof.

Indeed, in the present invention the second mould segment may be said to be coextensive with the glazing profile to be moulded, in that if the profile is only required around part of the periphery of the sheet, then the second mould segment need only extend for a corresponding distance. More precisely, it is the surface of the second mould segment forming part of the mould cavity which need only extend for a corresponding distance.

Figure 4:
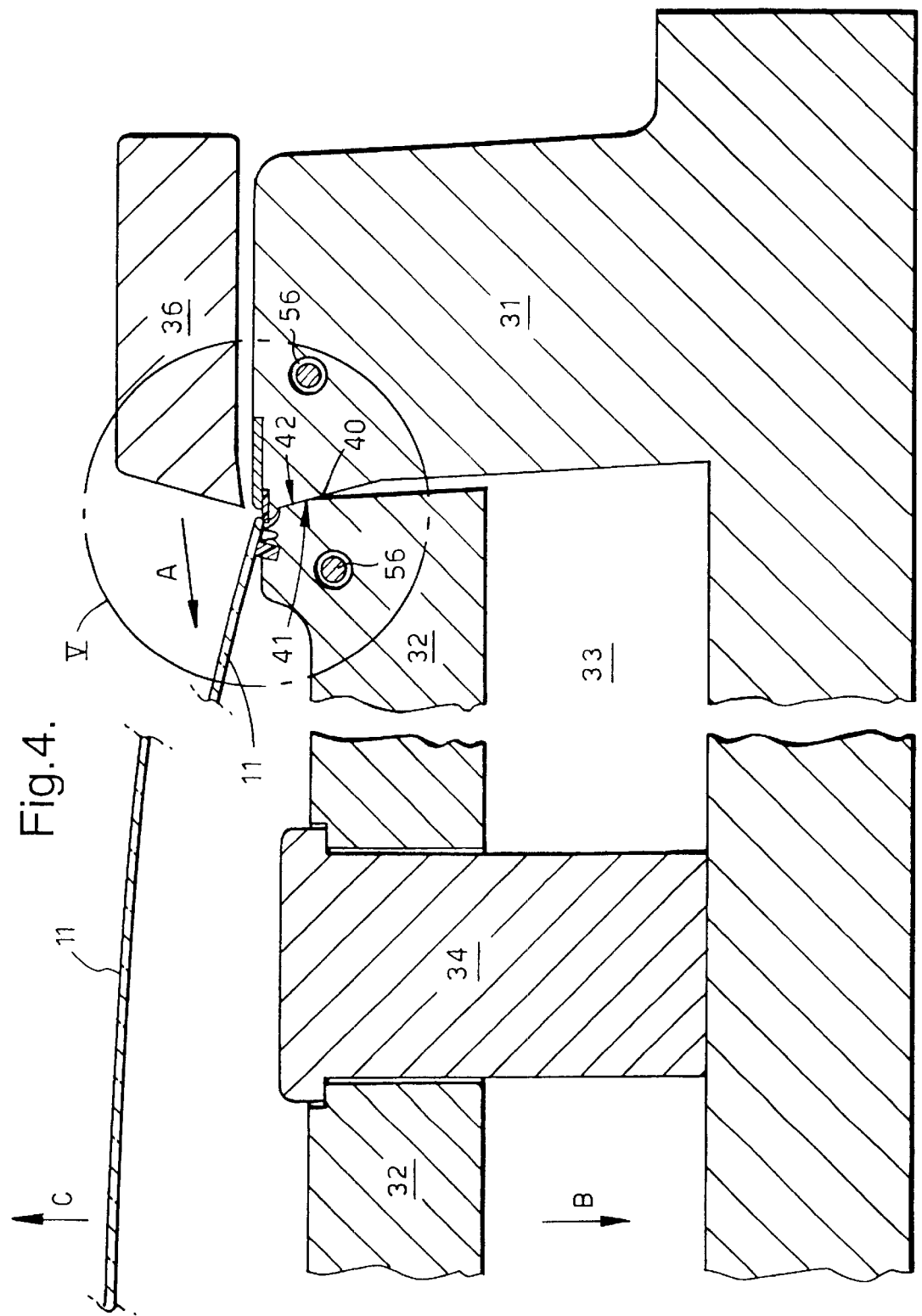
FIG. 4 is a sectional view of part of the mould of FIG. 3, taken along the line IV—IV (note this line is in two parts, one part being translated with respect to the other)
Figure 5:
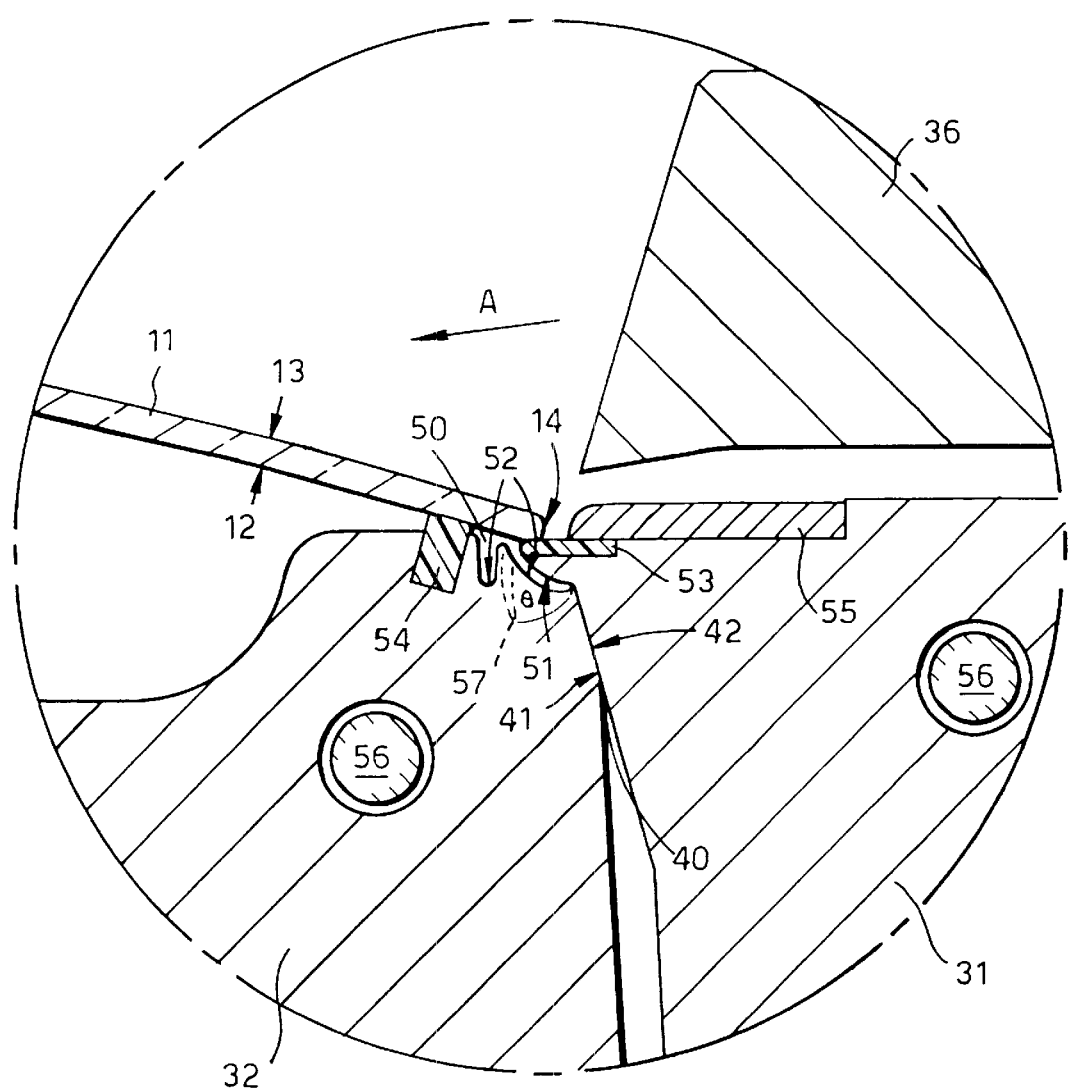
FIG. 5 is an enlarged fragmentary sectional view of the part of the mould circumscribed by circle V in FIG. 4, showing the mould cavity in greater detail.

FIG. 4 shows a cross-section of part of the mould. The relationship between the first mould segment 31 and the second mould segment 32 can be seen more clearly, in particular the joint 40 constituted by the mating surfaces 41,42 of the respective mould segments 31,32. In this embodiment of the invention, the second mould segment 32 is movable relative to the first mould segment 31 in the direction of arrow B, namely between a raised position (as shown in FIGS. 4 and 5), in which it is in intimate contact with the first mould segment, and a lowered position in which there is a gap between the two mould segments. The second mould segment is moved by conventional actuating means which are not shown. The direction of movement B (which obviously is reversible) is substantially perpendicular to a plane tangential to the centre of the sheet.

It is equally possible to design the mould so that the second mould segment 32 is fixed, and the first mould segment 31 moves relative to the second mould segment. In this case the first mould segment 31 would move upwards to open the mould, and downwards to close it. The location columns 34 and the actuating mechanism would be arranged differently, but the arrangement of the mould cavity (as described in connection with FIG. 5) need not be altered, and in particular, the show face is still entirely moulded by a single mould segment.

As the first mould segment 31 encircles the second mould segment 32, it is convenient to refer to them as the outer and inner mould segments respectively. However, it will be appreciated that the joint 40 between the two segments could be differently configured, for instance it could extend horizontally outwards from the mould cavity. In such an embodiment, the first segment would no longer encircle the second, and use of the terms "outer" and "inner" would not be appropriate.

The plane of demoulding of the completed part extends from sheet 11 outwards between the clamping members 36 and the first mould segment 31. It is with respect to this plane that features of the shape of the part are judged to be undercut.

FIG. 5 is an enlargement of the part of FIG. 4 enclosed by circle V. Parts of the first and second mould segments 31,32 and the clamp member 36 are shown, and arrow A denotes the direction of movement of clamp member 36. Also shown is the mould cavity 50, and it may in particular be seen how the cavity is defined by the co-operation of surfaces of the mould segments 31,32 together with part of face 12 of sheet 11. Surface 51 provided on mould segment 31 forms the wall of the mould cavity which moulds the show face 23 of the profile. It is this surface 51 which is kept free of joints as a result of its provision entirely on the one mould segment 31. Correspondingly, surface 52 provided on mould segment 32 moulds the various parts of the profile which are concealed after installation, such as the back of the lip 22 and the spacer portion 25.

Each mould segment includes sealing means in the form of a resilient seal against which the sheet is urged by the various clamp members 36. Mould segment 31 includes seal 53 which is held in place by seal retaining plate 55. Seal 53 defines the position of the outer edge 27 of the contact area of the profile. Mould segment 32 includes seal 54 which defines the inner edge 26 of the contact area of the profile, which is also the inner edge of the profile itself. The seats may be formed in solid elastomeric material, or a cellular resilient material may be used. Bladder type inflatable seals are also suitable.

As mentioned above, it is especially advantageous that the portion of the mould cavity that moulds the show face, namely surface 51, is entirely formed by a single mould segment, namely the first mould segment 31. In this way it is possible to ensure that the joint 40 does not extend over this surface 51, and consequently the show face remains free of moulding lines resulting from the joint. It is therefore important for the quality of the product that the surface which moulds the show face is maintained free of joints.

A particularly elegant feature of the mould design according to the invention is that any moulding line left by joint 40 is positioned at the very tip 28 (FIG. 2) of lip 22, where in any case there will always be a line simply as a result of the meeting of lip faces 23 and 24. Consequently, any mould line will not be noticeable in the finished part, and certainly not visible when the part is installed in a vehicle.

One consequence of this mould design for moulding onto a single side of the sheet (one-sided moulding) is that substantially all of the mould proper (i.e. substantially all of the mould segments) is on one side of the sheet. In this embodiment, the mould proper is below the sheet, i.e. the sheet is in effect on top of the mould rather than inside it as is the case with conventional mould designs comprising two complementary mould halves. Since neither the movement of the various moving components nor the filling of the mould cavity with moulding material are reliant upon gravity, it is perfectly possible to operate the mould in an inverted position (compared with the Figures) after relatively minor modifications. In this case the sheet would be placed on a cradle or ring and raised into contact with the first mould segment. This mode of operation may well be advantageous because mould surface 51, which moulds the show face, would then be on the underside of the mould cavity. Any bubbles in the liquid resinous material, after its injection into the mould cavity, would then rise away from the surface 51 rather than towards it. In such an arrangement, the show face is less likely to be marred by the presence of voids representing former bubbles.

It was described in connection with FIG. 2 how the profile 15 (more precisely its contact area 20) is set in from the peripheral edge face 14 by a short distance, and how, together with lip 22, a recess 29 was formed. This constitutes an undercut portion, and surface 51 of mould segment 31 is correspondingly undercut. The presence of this undercut also necessitates the use of at least two, relatively movable, mould segments, for it will be apparent from FIG. 5 that if the first and second mould segments were united to form a single mould segment, it would be impossible to remove the completed part from the mould without damage.

The inward displacement of the profile from the peripheral edge face may be exploited in concealing certain moulding lines on the profile. It is a fundamental aspect of the present invention to avoid joint lines on the show face, and apart from those that result from joints between two separate mould segments, it is also the case that a somewhat fainter line may result from a joint between a seal and the body of the mould segment. For instance, a joint exists within the first mould segment 31, between seal 53 and the body of that segment. Despite taking care in fitting the seal accurately and tightly, there may still be a slight discontinuity on surface 51, resulting in a faint moulding line on the moulded profile. However if, as in the present case, the seal is dimensioned such that the surface line of the joint between the seal and the remainder of the first mould segment is positioned inboard of the edge of the sheet, it will be concealed from view (after installation of the glazing) by the obscuration band 21 on the margin of the sheet.

It was pointed out in connection with FIG. 2 that the lip 22 projects outwardly beyond the peripheral edge face 14 of the sheet. It will consequently be apparent from FIG. 5 that the movable mould segment 32 also needs to extend outwardly beyond the edge of the sheet. This results in the plan area of segment 32 being greater than that of the sheet.

As is commonly known, many of the moulding materials, which may be used for moulding the profile, need to be maintained at an elevated temperature to obtain satisfactory curing, and this is certainly true of RIM materials. Consequently, both mould segments are provided with heating channels 56 through which e.g. hot water or oil at a selected temperature may be passed.

The moulding method will now be described with reference to the foregoing description of the mould structure. First the sheet of glazing material (which in most cases is a sheet of toughened glass) may be primed, and mould release agent applied to surfaces 51,52 of the mould, all in conventional fashion. The sheet is placed on the first mould segment and centralised thereon, e.g. by ensuring a uniform gap around it with feeler gauges. At this point the second mould segment is in the lowered position, and the sliding clamp members are retracted. The sheet is retained in its centralised position by applying vacuum to the suction cups 35, which engage the surface of the sheet. Next the sheet is clamped in position against seal 53 by advancing the sliding clamping members 36, and the second mould segment is raised until it is in intimate contact with the first mould segment to close the mould cavity. It will be noted that seal 54 on the moving mould segment 32 engages the sheet along the same line as clamp members 36, so that the forces exerted on the sheet by these items are directly opposite each other, thereby avoiding a situation in which the sheet could be subjected to a three point bend which would rapidly break it.

Injection of liquid resinous material (e.g. mixed RIM reactants) then occurs in conventional manner. The mixture is initially allowed to cure at least to the extent that it becomes solid; it not being necessary for complete curing to occur in the mould. The moving segment 32 is then lowered, the clamping members withdrawn and the suction cups disengaged. The sheet, complete with freshly moulded profile, may be removed either manually or automatically, and it is removed in the direction of arrow C in FIG. 4. It will be observed from FIGS. 4 and 5 that removing the sheet in this direction will cause temporary deformation of the lip, for it is necessary to flex the lip so that it can pass over the first mould segment, specifically the portion of that segment having surface 51.

It is surprising that it is possible to deform the profile in this way without damaging it, for previously it had not been considered feasible. This is all the more surprising for lips of greater width, since they are deformed to a greater extent. The present inventors have accordingly discovered a novel method of moulding an elastomeric glazing profile on a sheet of glazing material, which may be applicable to many moulds, including removing the part by temporarily deforming the profile during withdrawal.

The degree of deformation necessary in the present case is indicated in FIG. 5, where the position of the bent back lip is indicated in phantom, and denoted by reference numeral 57. The degree of deflection needed in a particular case will of course depend on the design of the profile and of the mould, but the angle θ through which the lip is bent will be in the range 0°–90°, and will preferably be at least 10°, more preferably at least 30°, possibly at least 60°.

Furthermore, it has also been found that the moulding material of the profile need not be fully cured at the time when the profile is removed from the mould. Surprisingly, profiles have been removed from the mould when not more than 90% cured, even when not more than 70% cured, dependent on lip width and shape. However, a minimum degree of initial cure is necessary to allow deformation of the lip without damage when it is removed from the mould.

A profile moulded in RIM polyurethane should be at least 50% polymerised (in terms of completion of the OH—NCO curing reaction), and preferably at least 60% cured before demoulding. More preferably the material is at least 85% cured. Obviously, 100% cured material will be suitable for demoulding from the point of view of its physical properties, but as the polyol-isocyanate reaction may take a considerable time to go to 100% completion, in practice the maximum degree of cure which it is practical to achieve before demoulding will be a few percent less than 100%, e.g. 98%. Degree of cure may be deduced by measurements of Shure A hardness or tensile strength on comparative samples.

As the curing process is of course temperature dependent, the profile might be allowed to cure at 80° C. for e.g. 30 seconds, or 100° C. for e.g. 20 seconds, or any corresponding conditions, to achieve the desired degree of initial cure.

Glazing profiles moulded in a mould according to the invention may include inserts of all the known types, for instance fixing means such as studs or brackets, auxiliary services such as conduits or cables, and the like. Such inserts may be co-moulded in the known manner.

It has been found that the novel mould and moulding process described above are capable of producing moulded products of superior quality and finish at an economical cost, thanks to the relatively simple design and construction.

What is claimed is:

1. A mould for moulding an elastomeric glazing profile in situ on a sheet of glazing material having two major faces and a peripheral edge face, the profile having a show face, wherein the mould comprises a first mould segment and at least one further mould segment which are relatively movable into a position in which they are in intimate contact with each other, at least one of the mould segments being arranged to receive the sheet of glazing material, and the mould segments defining together with the sheet a mould cavity for moulding the profile on a single major face of the sheet, and wherein the portion of the mould cavity that moulds the show face is entirely formed by a single mould segment.

2. A mould as claimed in claim 1, wherein the portion of the mould segment that moulds the show face is undercut.

3. A mould as claimed in claim 1, wherein one of the mould segments is annular in form.

4. A mould as claimed in claim 3, wherein the first mould segment includes a sealing means to seal against the sheet of glazing material, the contact area between the sheet and the profile is positioned a short distance inboard of the periphery of the sheet, and the joint between the sealing means and the remainder of the first mould segment is also positioned inboard of said periphery.

5. A mould as claimed in claim 1, wherein the at least one further mould segment is constituted by a single further segment.

6. A mould as claimed in claim 5, wherein the outline of the further mould segment in plan view corresponds approximately to the outline of the sheet of glazing material.

7. A mould as claimed in claim 1, wherein the profile extends adjacent the periphery of the sheet of glazing material for part or all of the periphery, and the surface of the further mould segment forming part of the mould cavity walls extends for a corresponding distance.

8. A mould as claimed in claim 1, wherein the plan area of the further mould segment is greater than the plan area of the sheet of glazing material.

9. A mould for moulding an elastomeric glazing profile in situ on a sheet of glazing material having two major faces and a peripheral edge face, the profile having a show face, wherein the mould comprises a first mould segment and at least one further mould segment which are relatively movable into a position in which they are in intimate contact with each other, at least one of the mould segments being arranged to receive the sheet of glazing material, and the mould segments defining together with the sheet a mould cavity for moulding the profile on a single major face of the sheet, and wherein the portion of the mould cavity that moulds the show face is entirely formed by a single mould segment, wherein the direction of relative movement of the mould segments is substantially perpendicular to a plane tangential to the centre of the sheet of glazing material.

* * * * *